Figure 1:
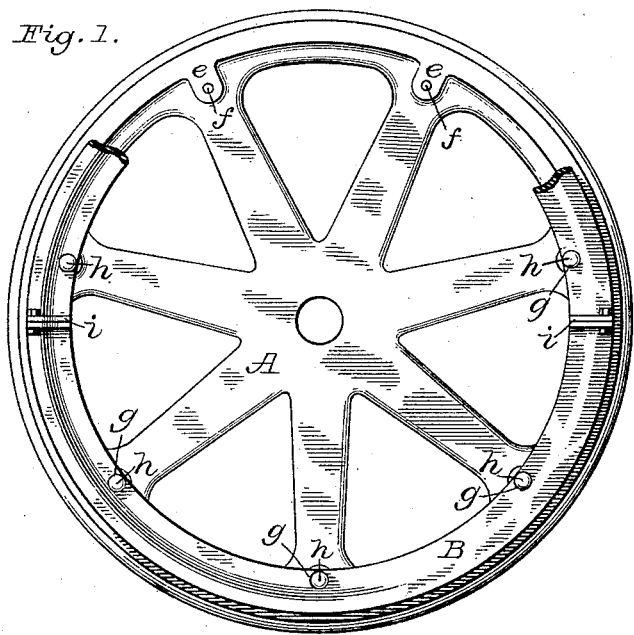

(No Model.) 2 Sheets—Sheet 1.

H. C. LOWRIE.
SWITCHING WHEEL FOR STREET CARS.

No. 327,095. Patented Sept. 29, 1885.

Attest:
Philip F. Larner.
Norvell T. Bartt.

Inventor:
Harvey C. Lowrie
By
Attorney.

(No Model.) H. C. LOWRIE. 2 Sheets—Sheet 2.
SWITCHING WHEEL FOR STREET CARS.

No. 327,095. Patented Sept. 29, 1885.

Attest:
Philip F. Larner
Howell Bartle

Inventor:
Harvey C. Lowrie
By Wm C. Wood
Attorney.

United States Patent Office.

HARVEY C. LOWRIE, OF DENVER, COLORADO.

SWITCHING-WHEEL FOR STREET-CARS.

SPECIFICATION forming part of Letters Patent No. 327,095, dated September 29, 1885.

Application filed September 15, 1884. (No model.)

*To all whom it may concern:*

Be it known that I, HARVEY C. LOWRIE, of Denver, in the county of Arapahoe and State of Colorado, have invented certain new and useful Improvements in Switching-Wheels for Street-Railway Cars; and I do hereby declare that the following specification, taken in connection with the drawings furnished and forming a part of the same, is a clear, true, and complete description of the several features of my invention.

For obviating switch-tending and complicated underground automatic switching mechanism, switching-wheels have heretofore been devised to co-operate with frogs having special grooves or raised ribs, so as to cause a car to enter upon any particular predetermined branch of road, and also such other branches as corresponded with the first in direction.

So far as my knowledge extends, such switch-wheels prior to my invention have either been permanently mounted upon a car-axle as a regular wheel of the car or on a vertical axis permanently attached to and pendent from the bottom of the car. In both instances the movements of cars provided with such wheels were limited to certain routes, and could not be elsewhere employed, except with great annoyance at each frog, and the use of special or portable switching devices, or completely dismounting a car of its axle and wheels and substituting others. These objections have largely resulted in the use of expensive and complicated underground switch mechanism, notwithstanding their extreme liability of getting out of order and of being clogged with ice and snow.

As a novel feature in switch-wheels, I employ a switching-flange or flange-wheel which is readily adjustable on the line of the car-axle, whereby said flange, as a switching medium, may be rendered inoperative, or if organized, for instance, to turn a car to the right hand, it can be readily and with little labor shifted in position to turn a car to the left hand, it being assumed that the road on which said car travels is provided with frogs adapted to co-operate with said properly-adjusted switch-wheels. In what I deem its best form my adjustable switch-wheel embodies an ordinary car-wheel, so far as flange and tread is concerned, but having at its inner and outer sides a plain annular surface, near its periphery, pierced with lateral bolt-holes, and a switch-wheel flange, which is capable of being operatively applied to either side of the car-wheel and to be securely bolted thereto, thus providing for the adjustment of the switch-wheel flange longitudinally on the line of the axle to the extent of the thickness of each wheel, and this can be readily supplemented by the interposition of rings of different thicknesses between the detachable flange and the wheel. With this construction and switch-flanges of various diameters, and obvious corresponding variations in the rail-frogs of a street-railway system, it will be seen that any car can in a few minutes and with but little labor be adapted for service on any route.

As an equivalent for the construction stated, so far as convenient shifting is concerned, it will be sometimes found desirable to provide a switch-flange with a hub of its own, and mount it upon an axle inside of the car-wheel; but such would not embody my improvements unless it were so mounted upon the axle—as by a set-screw and key, for instance—that it could be readily adjusted longitudinally on the axle.

Figure 2:
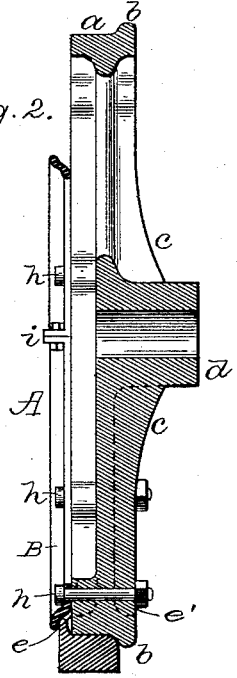
Figure 3:
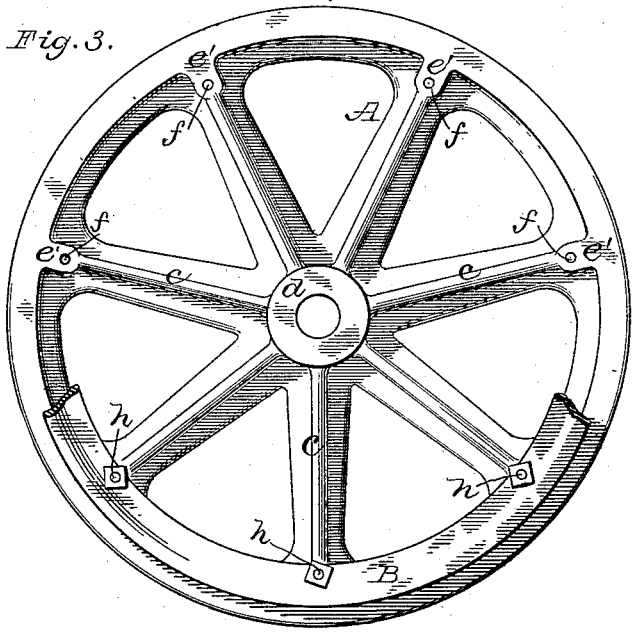
Figure 4:
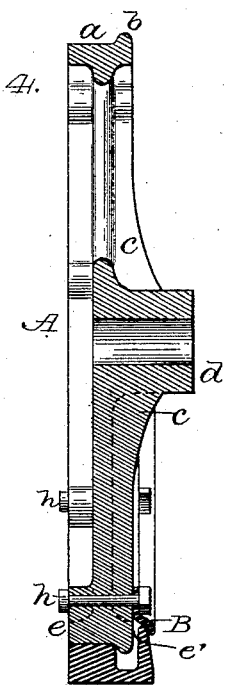
Figure 8:
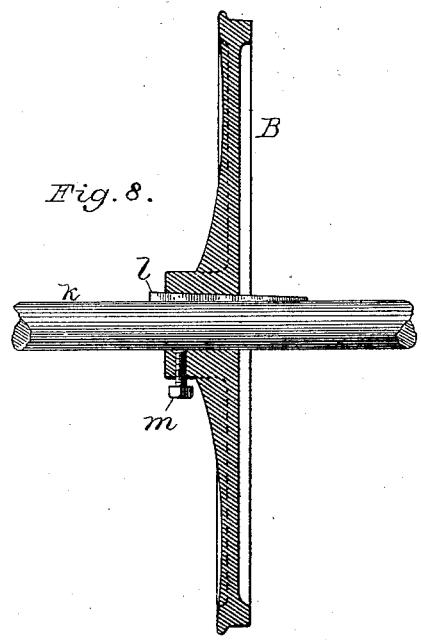
Figure 6:
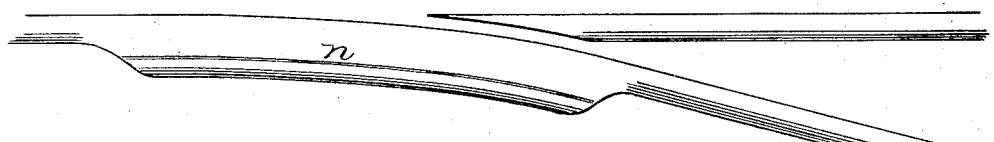
Figure 7:
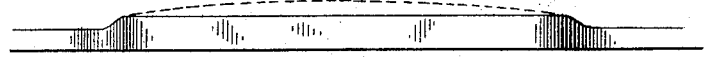
Figure 5:
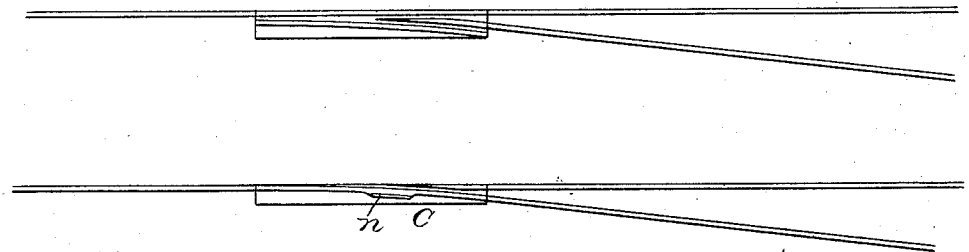

To more fully describe my invention, I will refer to the accompanying drawings, in which Figures 1 and 2 illustrate in side view and section a car-wheel provided on its outer face with a switch-flange. Figs. 3 and 4 in similar views illustrate a car-wheel with said switch-flange applied to its inner face. Fig. 5 is a plan view of one form of frog adapted for use with switch-wheels. Figs. 6 and 7 are enlarged views of portions of said frog. Fig. 8 is a sectional view of a switch-flange provided with its own hub, and illustrates a method of adjustably mounting it on a car-axle between the car-wheels.

The car-wheel A has the usual tread, *a*, flange *b*, inside webs, *c*, and hub *d*. On its outer side, near its periphery, said wheel has a flat annular face or series of faces, *e*, and a series of lateral bolt-holes, *f*, at proper points around the wheel. On its inner face said wheel has a similar flat face or faces, $e'$, these seats being the best points for the location of the bolt-holes.

The switch-flange B may be largely varied in its peripheral contour without departure from my invention; but it must have a series of bolt-holes, $g$, coincident with those on the car-wheel, and a fit surface near its periphery to admit of its being properly clamped upon the wheel by the bolts $h$. Said switch-flanges may be cast in one piece or made in two or more segmental sections; but I prefer that they be made in two parts, as shown, and formed of so-called "malleable-iron" or of wrought-iron or steel, and provided with lips $i$ at the joints, and tie-bolts, as shown, for greater convenience in handling, incident to their adjustment.

In Fig. 8 the switch-wheel B has its own web and hub, and is mounted on the car-axle $k$, so as to be readily adjusted longitudinally thereon. The eye of the wheel is large enough to freely receive the axle, and also to receive the key $l$, and in its hub there is a set-screw, $m$. Other obvious means for locking this flange-wheel to the axle may be employed without departure from my invention, but they must be such as to enable variations in adjustment to be made with facility.

It will be seen that by loosening the set-screw the key can be readily withdrawn, and for securing the wheel the set-screw is first turned partially into good contact with the axle, and the key is then driven into its seat; but it cannot be so firmly set that it cannot be readily released on turning back the set-screw.

With the detachable and adjustable switch-flanges or the flange-wheel, Fig. 8, the frogs would in each case be constructed so as to co-operate with the particular adjustment. As, for instance, if a branch track were entered toward the right hand, as seen in Fig. 5, the switch-flange B would be located on the outer side of the right-hand front wheel of a car, and when the frog C was reached its curved rib $n$ would be engaged by the wheel-flange and cause the car to properly pass the frog. A second switch-flange on the inner side of the left-hand front wheel might be also used with a frog on that side of the track, similarly provided with a guiding-rib; but one flange and rib is usually deemed sufficient.

It will be readily seen that when cars must be temporarily run over routes other than regular it will be an easy matter to adapt them to any given route if the rolling-stock superintendent be provided with a schedule giving the number or size of the particular flanges required for each turn-out on all the routes; and it will be equally obvious that if both sides of the wheels be provided with switch-flanges a car will readily turn into properly-constructed frogs, whether toward the right hand or the left, thus providing for all possible contingencies. A car whose forward right wheel was flanged outside might be turned to the right at one place, while a car whose forward left wheel was flanged inside might pass such turn-out, to be guided to the right at some farther turnout as desired, and so on.

Having thus described my invention, I claim as new and desire to secure by Letters Patent—

1. The combination, with a car-axle, of a switching-flange adjustable on the longitudinal line of the axle, substantially as described.

2. The combination of a car-wheel and a readily detachable and adjustable switching-flange adapted to be secured to either or both sides of the car-wheel, substantially as described.

HARVEY C. LOWRIE.

Witnesses:
ANDREW RYAN,
J. S. LITTELL.